United States Patent
Ramaiyer et al.

(10) Patent No.: US 11,734,293 B2
(45) Date of Patent: *Aug. 22, 2023

(54) SYSTEM AND METHOD FOR CLIENT-SIDE CALCULATION IN A MULTIDIMENSIONAL DATABASE ENVIRONMENT

(71) Applicant: Oracle International Corporation, Redwood Shores, CA (US)

(72) Inventors: Kumar Ramaiyer, Cupertino, CA (US); John Xiao, Cupertino, CA (US)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 64 days.

This patent is subject to a terminal disclaimer.

(21) Appl. No.: 17/153,386

(22) Filed: Jan. 20, 2021

(65) Prior Publication Data

US 2021/0141800 A1 May 13, 2021

Related U.S. Application Data

(63) Continuation of application No. 16/023,818, filed on Jun. 29, 2018, now Pat. No. 10,909,134.

(Continued)

(51) Int. Cl.
*G06F 16/25* (2019.01)
*G06F 17/11* (2006.01)
(Continued)

(52) U.S. Cl.
CPC .......... *G06F 16/252* (2019.01); *G06F 16/258* (2019.01); *G06F 16/283* (2019.01);
(Continued)

(58) Field of Classification Search
None
See application file for complete search history.

(56) References Cited

U.S. PATENT DOCUMENTS

| 5,574,952 A | 11/1996 | Brady |
| 5,915,129 A | 6/1999 | Slivka |

(Continued)

FOREIGN PATENT DOCUMENTS

| JP | 2007531939 | 11/2007 |
| WO | 2015067014 | 5/2015 |

OTHER PUBLICATIONS

Japanese Patent Office, Notice of Reasons of Refusal dated May 11, 2022 for Japanese Patent Application No. 2021-502778, 3 pages.

(Continued)

*Primary Examiner* — Giuseppi Giuliani
(74) *Attorney, Agent, or Firm* — Tucker Ellis LLP

(57) ABSTRACT

In accordance with an embodiment, described herein are systems and methods that enable client-side calculation with data provided at a multidimensional or other database server. Data provided at the server in accordance with a server-side model, can be transformed/prepared into a grid, for use with a client-side application, for example a client spreadsheet application. During preparation of the grid, one or more portions of the grid that are identified as client-side dynamic parameters, can be represented as dynamic formulas that are modifiable within the client-side application; while parameters of the server-side model that are outside of the grid can be represented as constant values. The grid provided to the client can be used to perform client-side calculations that allow for rapid calculations in response to changes in the client-side model, without introducing a round-trip performance lag between the client-side and server-side.

20 Claims, 8 Drawing Sheets

Related U.S. Application Data

(60) Provisional application No. 62/553,359, filed on Sep. 1, 2017.

(51) Int. Cl.
  *G06F 16/28* (2019.01)
  *G06F 40/18* (2020.01)
  *H04L 67/01* (2022.01)

(52) U.S. Cl.
  CPC .............. *G06F 17/11* (2013.01); *G06F 40/18* (2020.01); *H04L 67/01* (2022.05)

(56) References Cited

U.S. PATENT DOCUMENTS

| | | |
|---|---|---|
| 6,161,105 A | 12/2000 | Keighan |
| 6,317,750 B1 | 11/2001 | Tortolani |
| 6,477,536 B1 | 11/2002 | Pasumansky |
| 6,574,720 B1 | 6/2003 | Hopeman |
| 6,629,102 B1 | 9/2003 | Malloy |
| 6,766,325 B1 | 7/2004 | Pasumansky |
| 7,133,876 B2 | 11/2006 | Roussopoulos |
| 7,392,242 B1 | 6/2008 | Baccash |
| 7,392,248 B2 | 6/2008 | Bakalash |
| 7,536,400 B2 | 5/2009 | Pasumansky |
| 7,702,718 B2 | 4/2010 | Batra |
| 7,792,784 B2 | 9/2010 | Gupta |
| 8,082,239 B2 | 12/2011 | Yang |
| 8,156,083 B2 | 4/2012 | Banerjee |
| 9,081,830 B1 | 7/2015 | Stolte |
| 9,390,082 B1 | 7/2016 | Stolte |
| 10,083,195 B2 | 9/2018 | Zhou |
| 10,318,498 B2 | 6/2019 | Tran |
| 10,346,435 B2 | 7/2019 | Walker |
| 10,360,527 B2 | 7/2019 | Abe |
| 10,467,251 B2 | 11/2019 | Menon |
| 2002/0029207 A1 | 3/2002 | Bakalash |
| 2003/0005420 A1 | 1/2003 | Ghosh |
| 2004/0054858 A1 | 3/2004 | Chandrasekaran |
| 2005/0071349 A1 | 3/2005 | Jordan |
| 2005/0223021 A1 | 10/2005 | Batra |
| 2005/0262108 A1 | 11/2005 | Gupta |
| 2006/0010159 A1 | 1/2006 | Mirchandani |
| 2006/0085742 A1 | 4/2006 | Harold |
| 2006/0106769 A1 | 5/2006 | Gibbs |
| 2006/0212672 A1 | 9/2006 | Chandrasekaran |
| 2006/0271568 A1 | 11/2006 | Balkir |
| 2007/0022120 A1 | 1/2007 | Huang |
| 2007/0027674 A1 | 2/2007 | Parson |
| 2007/0061344 A1 | 3/2007 | Dickerman |
| 2007/0088691 A1 | 4/2007 | Dickerman |
| 2007/0094668 A1 | 4/2007 | Jacquot |
| 2008/0288524 A1 | 11/2008 | Dumitru |
| 2008/0301086 A1 | 12/2008 | Gupta |
| 2009/0030915 A1 | 1/2009 | Winter |
| 2009/0248651 A1 | 10/2009 | Perry |
| 2009/0249125 A1 | 10/2009 | Bhatawdekar |
| 2009/0276705 A1 | 11/2009 | Ozdemir |
| 2009/0292730 A1 | 11/2009 | Li |
| 2010/0174879 A1 | 7/2010 | Pawar |
| 2012/0296883 A1 | 11/2012 | Ganesh |
| 2014/0046920 A1 | 2/2014 | Shuma |
| 2014/0052764 A1 | 2/2014 | Michael |
| 2014/0122413 A1 | 5/2014 | Presti |
| 2016/0092424 A1 | 3/2016 | Kulkarni |
| 2017/0116032 A1 | 4/2017 | Tran |
| 2017/0116215 A1 | 4/2017 | Ramaiyer |
| 2017/0116281 A1 | 4/2017 | Roytman |
| 2017/0116290 A1 | 4/2017 | Reichman |
| 2017/0116309 A1 | 4/2017 | Menon |
| 2017/0116310 A1 | 4/2017 | Walker |
| 2017/0116311 A1 | 4/2017 | Reichman |
| 2017/0116312 A1 | 4/2017 | Reichman |
| 2017/0116313 A1 | 4/2017 | Roytman |
| 2017/0308315 A1 | 10/2017 | Wang |
| 2019/0073366 A1 | 3/2019 | Raimaiyer |
| 2019/0079959 A1 | 3/2019 | Raimaiyer |
| 2019/0102445 A1 | 4/2019 | Raimaiyer |
| 2019/0102446 A1 | 4/2019 | Raimaiyer |
| 2019/0102447 A1 | 4/2019 | Raimaiyer |
| 2019/0258612 A1 | 8/2019 | Tran |
| 2019/0286638 A1 | 9/2019 | Walker |

OTHER PUBLICATIONS

Jankovszky, Andra et al., Edgewater Ranzal, Oracle Platinum Consulting Partner, "The Uncharted Territory Ready to be Discovered: Hybrid Essbase", Hyperion UKOUG, Jun. 18, 2015, 24 pages.

Russakovsky, Alexander; "Hopping over Big Data: Accelerating Ad-hoc OLAP Queries with Grasshopper Algorithms" published Feb. 26, 2015, 30 pages.

Dynamic Flow process definition Nov. 26, 2018, google.com, hllps://www.google.com/search?oiw=1920&bih=1076&ei=njv8W_CJD4mizwK_l4gCQ&q=%22dynamic+flow+process%22+definition&oq=%22dynamic•flow+process%22+definition&gs l=psy-ab .3 ... 38876 .39886 .. 40199 ... 0 .0 .. 0. 76.437 .8 ...... 0 .... 1 .. gws-.viz ....... Oi71 j0i7i30j0i30j0i8i30.

Dynamic Flow process OLAP Nov. 26, 2018, google.com, https://www.google.com/search?oiw=1920&bih=1076&ei=njv8W_CJD4mizwK_l4gCQ&q=%22dynamic+flow+process%22+definition&oq=%22dynamic•flow+process%22+definition&gs l=psy-ab .3 ... 38876 .39886 .. 40199 ... 0 .0 .. 0. 76.437 .8 ...... 0 .... 1 .. gws-.vizOi71j0i7i30j0i30j0i8i30j33i10.

PerformanceArchHowTo, Aggregate Storage Option ASO vs Block Storage Option BSO Contrast and Comparison Aug. 24, 2011, youtube.com, https://www.youtube.com/watch?v=i8AeH5UGT90.

Oracle ©, Oracle Enterprise Performance Management System Documentation, Release 11.1.2.4/ Essbase, Database Administrator's Guide, Developing Formulas for Block Storage Databases, Copyright © 2019, 28 pages.

Larimer, Mike et al., Oracle, OAC Essbase Hybrid Block Storage Option Performance Tuning, White Paper, Oracle ©, Jun. 11, 2018, 24 pages.

Oracle, Oracle® Cloud, Oracle Cloud Administering Oracle Essbase Cloud, Copyright © 1996, 2016, 632 pages.

Oracle, Oracle® Cloud, Administering Oracle Analytics Cloud—Essbase, Copyright © 1996, 2017, 703 pages.

Essbase Information Development Team, Oracle® Cloud, Technical Reference for Oracle Analytics Cloud—Essbase, E70189-04, Sep. 2017, Copyright © 1996, 2017, 1044 pages.

EPM Information Development Team, Oracle® Essbase Release 11.1.1, Database Administrator's Guide, Copyright © 1996, 2008, 1182 pages.

EPM Information Development Team, Oracle® Essbase, Technical Reference, Release 11.1.2.2.100, Copyright © 1996, 2012, 1402 pages.

EPM Information Development Team, Oracle® Essbase Database Administrator's Guide, Release 11.1.2.2.100, Updated Dec. 2013, Copyright © 1996, 2013, 1138 pages.

Turrell, Jake, "Introduction to Essbase Hybrid Aggregation Mode", Mar. 4, 2015, 12 pages, retrieved on Jan. 15, 2020 from: <http://turrellconsulting.com/blog/?s=introduction+to+essbase+hybrid+aggregation+mode&searchsubmit=U>.

Driscoll, James R. et al., "Making Data Structures Persistent", Journal of Computer and System Sciences, vol. 38, No. 1, Feb. 1989, Printed in Belgium, Copyright © 1989, 39 pages.

Oracle, EPM Information Development Team, Oracle ® Integrated Operational Planning, Fusion Edition Release 4.0.1 Installation Guide, Copyright © 2001, 2009, 18 pages.

Oracle, EPM Information Development Team, Oracle® Integrated Operational Planning, Fusion Edition Release 4.0.1 User's Guide, Copyright © 2004, 2009, 272 pages.

Pearson, William E., "Integrating Microsoft SQL Server 2000 OLAP and Microsoft Office: Creating a Local Cube with Office 2000", Nov. 1, 2002, 7 pages, retrieved from: <https://www.informit.com/articles/article.aspx?p=29880>.

Whitney, Russ, "Mastering OLAP: Local Cube Files" Dec. 20, 1999, 6 pages, retrieved from: <http://www.itprotoday.com/business-intelligence/mastering-olap-local-cube-files>.

SYSTEM AND METHOD FOR CLIENT-SIDE CALCULATION IN A MULTIDIMENSIONAL DATABASE ENVIRONMENT

CLAIM OF PRIORITY

This application is a continuation of U.S. patent application entitled "SYSTEM AND METHOD FOR CLIENT SIDE CALCULATION IN A MULTIDIMENSIONAL ENVIRONMENT", application Ser. No. 16/023,818, filed on Jun. 29, 2018, which claims priority to U.S. Provisional patent application entitled "SYSTEM AND METHOD FOR CLIENT SIDE CALCULATION IN A MULTIDIMENSIONAL ENVIRONMENT", Application No. 62/553,359, filed on Sep. 1, 2017; both of which applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to databases and multidimensional databases, and are particularly related to systems and methods for supporting client-side calculation in a multidimensional database environment.

BACKGROUND

Multidimensional database computing environments enable companies to deliver critical business information to appropriate decision makers, with the ability to leverage and integrate data from multiple data sources, and distribute filtered information in a variety of formats that best meet the particular needs of end users.

Some users may prefer to access the information provided by a multidimensional database in a local or client-side application, for example a spreadsheet application, where they can perform additional tasks such as further manipulating the data for use in determining particular insights, or creating other reports or presentations. These are some examples of the types of environments in which embodiments of the invention can be used.

SUMMARY

In accordance with an embodiment, described herein are systems and methods that enable client-side calculation with data provided at a multidimensional or other database server. Data provided at the server in accordance with a server-side model, can be transformed into a grid, for use with a client-side application, for example a client spreadsheet application. During preparation of the grid, one or more portions of the grid that are identified as client-side dynamic parameters, can be represented as dynamic formulas that are modifiable within the client-side application; while parameters of the server-side model that are outside of the grid can be represented as constant values. The grid provided to the client can be used to perform client-side calculations that allow for rapid calculations in response to changes in the client-side model, without introducing a round-trip performance lag between the client-side and server-side.

In accordance with an embodiment, described herein are methods and systems for client-side calculation in a multidimensional database. An exemplary method can provide, at a computer that includes one or more microprocessors, a multidimensional database server executing on the computer, that comprises data organized according to a server-side model, the server-side model comprising a plurality of parameters. The method can, upon receipt of a request from a client-side application for a set of the data to be used for client-side calculation, prepare an input grid, the input gird comprising a set of the plurality of parameters. Upon the preparation of the input grid, the method can prepare an output grid that comprises one or more dynamic formulas that represent one or more parameters of the set of the plurality of parameters of the input grid, wherein the output grid further represents one or more parameters of the plurality of parameters of the server-side model outside the input grid as constant values. The method can return the output grid to the client-side application in response to the request.

DETAILED DESCRIPTION

The foregoing, together with other features, will become apparent upon referring to the enclosed specification, claims, and drawings. Specific details are set forth in order to provide an understanding of various embodiments. However, it will be apparent that various embodiments can be practiced without these specific details. The enclosed specification and drawings are not intended to be restrictive.

Multidimensional database environments, an example of which includes Oracle Essbase, can be used to integrate large amounts of data, in some instances from multiple data sources, and distribute filtered information to end-users, in a manner that addresses those users' particular requirements.

Figure 1:
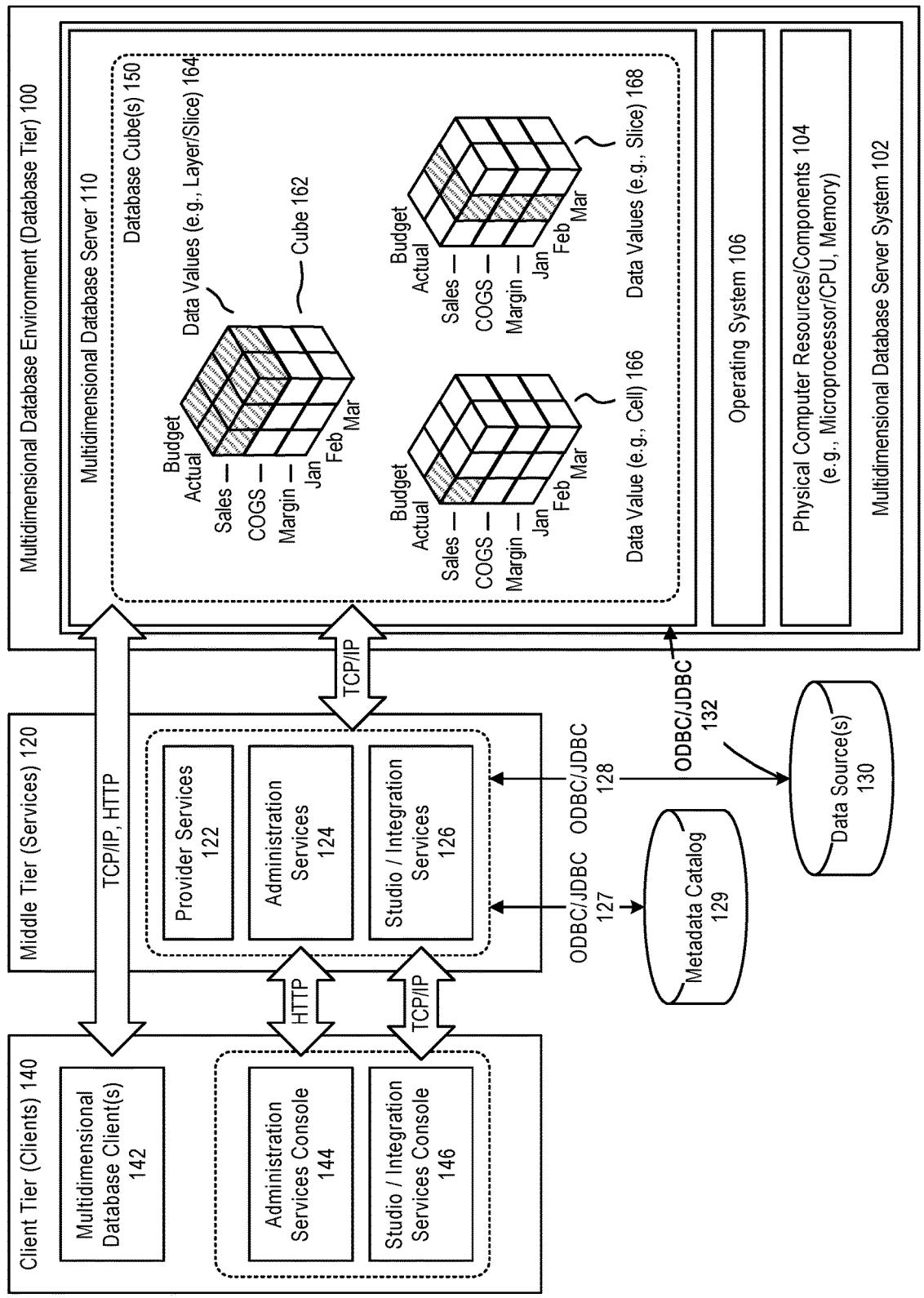
FIG. 1 illustrates an example of a multidimensional database environment, in accordance with an embodiment.

FIG. 1 illustrates an example of a multidimensional database environment 100, in accordance with an embodiment.

As illustrated in FIG. 1, in accordance with an embodiment, a multidimensional database environment, operating as a database tier, can include one or more multidimensional database server system(s) 102, each of which can include physical computer resources or components 104 (e.g., microprocessor/CPU, physical memory, network components), an operating system 106, and one or more multidimensional database server(s) 110 (e.g., Essbase Servers).

In accordance with an embodiment, a middle tier 120 can include one or more service(s), such as, for example, provider services 122 (e.g., Hyperion Provider Services), administration services 124 (e.g., Essbase Administration Services), or studio/integration services 126 (e.g., Essbase Studio/Essbase Integration Services). The middle tier can provide access, via ODBC/JDBC 127, 128, or other types of interfaces, to a metadata catalog 129, and/or one or more data source(s) 130 (for example, a relational database), for use with the multidimensional database environment.

In accordance with an embodiment, the one or more data source(s) can also be accessed, via ODBC/JDBC 132, or other types of interfaces, by the one or more multidimensional database server(s), for use in providing a multidimensional database.

In accordance with an embodiment, a client tier 140 can include one or more multidimensional database client(s) 142 (e.g., Essbase Server clients), that enable access to a multidimensional database (such as, for example, Smart View, Spreadsheet Add-in, Smart Search, Administration Services, MaxL, XMLA, CAPI or VB API Applications, Oracle Business Intelligence Enterprise Edition Plus, or other types of multidimensional database clients). The client tier can also include consoles, for use with services in the middle tier, such as for example an administration services console 144, or a studio/integration services console 146.

In accordance with an embodiment, communication between the client, middle, and database tiers can be provided by one or more of TCP/IP, HTTP, or other types of network communication protocols.

In accordance with an embodiment, the multidimensional database server can integrate data from the one or more data source(s), to provide a multidimensional database, data structure, or cube(s) 150, which can then be accessed to provide filtered information to end-users.

Generally, each data value in a multidimensional database is stored in one cell of a cube; and a particular data value can be referenced by specifying its coordinates along dimensions of the cube. The intersection of a member from one dimension, with a member from each of one or more other dimensions, represents a data value.

For example, as illustrated in FIG. 1, which illustrates a cube 162 that might be used in a sales-oriented business application, when a query indicates "Sales", the system can interpret this query as a slice or layer of data values 164 within the database that contains all "Sales" data values, where "Sales" intersect with "Actual" and "Budget". To refer to a specific data value 166 in a multidimensional database, the query can specify a member on each dimension, for example by specifying "Sales, Actual, January". Slicing the database in different ways, provides different perspectives of the data; for example, a slice of data values 168 for "February" examines all of those data values for which a time/year dimension is fixed for "February".

Database Outline

In accordance with an embodiment, development of a multidimensional database begins with the creation of a database outline, which defines structural relationships between members in the database; organizes data in the database; and defines consolidations and mathematical relationships. Within the hierarchical tree or data structure of the database outline, each dimension comprises one or more members, which in turn may comprise other members. The specification of a dimension instructs the system how to consolidate the values of its individual members. A consolidation is a group of members within a branch of the tree.

Dimensions and Members

In accordance with an embodiment, a dimension represents the highest consolidation level in the database outline. Standard dimensions may be chosen to represent components of a business plan that relate to departmental functions (e.g., Time, Accounts, Product Line, Market, Division). Attribute dimensions, that are associated with standard dimensions, enable a user to group and analyze members of standard dimensions based on member attributes or characteristics. Members (e.g., Product A, Product B, Product C) are the individual components of a dimension.

Dimension and Member Relationships

In accordance with an embodiment, a multidimensional database uses family (parents, children, siblings; descendants and ancestors); and hierarchical (generations and levels; roots and leaves) terms, to describe the roles and relationships of the members within a database outline.

In accordance with an embodiment, a parent is a member that has a branch below it. For example, "Margin" may be a parent for "Sales", and "Cost of Goods Sold" (COGS). A child is a member that has a parent above it. In the above example, "Sales" and "Cost of Goods Sold" are children of the parent "Margin". Siblings are children of the same immediate parent, within the same generation.

In accordance with an embodiment, descendants are members in branches below a parent. For example, "Profit", "Inventory", and "Ratios" may be descendants of Measures; in which case the children of "Profit", "Inventory", and "Ratios" are also descendants of Measures. Ancestors are members in branches above a member. In the above example, "Margin", "Profit", and Measures may be ancestors of "Sales".

In accordance with an embodiment, a root is the top member in a branch. For example, Measures may be the root for "Profit", "Inventory", and "Ratios"; and as such for the children of "Profit", "Inventory", and "Ratios". Leaf (level 0) members have no children. For example, Opening "Inventory", Additions, and Ending "Inventory" may be leaf members.

In accordance with an embodiment, a generation refers to a consolidation level within a dimension. The root branch of the tree is considered to be "generation 1", and generation numbers increase from the root toward a leaf member. Level refers to a branch within a dimension; and are numbered in reverse from the numerical ordering used for generations, with level numbers decreasing from a leaf member toward its root.

In accordance with an embodiment, a user can assign a name to a generation or level, and use that name as a shorthand for all members in that generation or level.

Sparse and Dense Dimensions

Data sets within a multidimensional database often share two characteristics: the data is not smoothly and uniformly distributed; and data does not exist for a majority of member combinations.

In accordance with an embodiment, to address this, the system can recognize two types of standard dimensions: sparse dimensions and dense dimensions. A sparse dimension is one with a relatively low percentage of available data positions filled; while a dense dimension is one in which there is a relatively high probability that one or more cells is occupied in every combination of dimensions. Many multidimensional databases are inherently sparse, in that they lack data values for the majority of member combinations.

Data Blocks and the Index System

In accordance with an embodiment, the multidimensional database uses data blocks and an index to store and access data. The system can create a multidimensional array or data block for each unique combination of sparse standard dimension members, wherein each data block represents the dense dimension members for its combination of sparse dimension members. An index is created for each data block, wherein the index represents the combinations of sparse standard dimension members, and includes an entry or pointer for each unique combination of sparse standard dimension members for which at least one data value exists.

In accordance with an embodiment, when the multidimensional database server searches for a data value, it can use the pointers provided by the index, to locate the appropriate data block; and, within that data block, locate the cell containing the data value.

Administration Services

In accordance with an embodiment, an administration service (e.g., Essbase Administration Services) provides a single-point-of-access that enables a user to design, develop, maintain, and manage servers, applications, and databases.

Studio

In accordance with an embodiment, a studio (e.g., Essbase Studio) provides a wizard-driven user interface for performing tasks related to data modeling, cube designing, and analytic application construction.

Spreadsheet Add-in

In accordance with an embodiment, a spreadsheet add-in integrates the multidimensional database with a spreadsheet, which provides support for enhanced commands such as Connect, Pivot, Drill-down, and Calculate.

Integration Services

In accordance with an embodiment, an integration service (e.g., Essbase Integration Services), provides a metadata-driven environment for use in integrating between the data stored in a multidimensional database and data stored in relational databases.

Provider Services

In accordance with an embodiment, a provider service (e.g., Hyperion Provider Services) operates as a data-source provider for Java API, Smart View, and XMLA clients.

Smart View

In accordance with an embodiment, a smart view provides a common interface for, e.g., Hyperion Financial Management, Hyperion Planning, and Hyperion Enterprise Performance Management Workspace data.

Developer Products

In accordance with an embodiment, developer products enable the rapid creation, management, and deployment of tailored enterprise analytic applications.

Lifecycle Management

In accordance with an embodiment, a lifecycle management (e.g., Hyperion Enterprise Performance Management System Lifecycle Management) provides a means for enabling enterprise performance management products to migrate an application, repository, or individual artifacts across product environments.

OLAP

In accordance with an embodiment, online analytical processing (OLAP) provides an environment that enables users to analyze enterprise data. For example, finance departments can use OLAP for applications such as budgeting, activity-based costing, financial performance analysis, and financial modeling, to provide "just-in-time" information.

In accordance with an embodiment, OLAP systems can organize data in multiple dimensions allows searchers/users of the data set to conduct directed searches that traverse various dimensions to ultimately arrive at the result of interest. OLAP systems can view data as residing at the intersection of dimensions. Put another way, the data underlying OLAP systems can be organized and stored as a multi-dimensional database which is an instantiation of the cross-product of all of the dimensions. This allows users/searchers to traverse hierarchies of detail along dimensions of interest in an ad hoc manner to get at specific, targeted data. Slowly changing data can be represented as metadata within a current data set.

Support for Client-Side Calculations

As described above, some users of multidimensional database environments may prefer to access the information provided by a multidimensional database in a local or client-side application, for example a spreadsheet application, where they can perform additional tasks such as further manipulating the data, for use in determining particular insights, or creating other reports or presentations.

However, a disadvantage of some server-based multidimensional or other database environments which include a non-local or remote data structure, is that "power users"—who may be accustomed to near-instantaneous calculations and results they can generate within a client-side application, for example a locally-executed Microsoft Excel™ spreadsheet, using only locally-stored data—may experience a performance lag due to round-trip communication between their client-side application and the remote data structure or calculations provided by the server.

For example, in a financial sales-oriented Excel™ spreadsheet that uses only locally-stored data, a user might wish to explore changing a cell amount in their local spreadsheet, to modify a particular sales amount, in response to which the remaining cells can be updated near-instantaneously, at the client-side, based upon the formulas provided within the spreadsheet.

However, in a server-based multidimensional or other database environment, when such a change is made to a remote database structure at the server, for example to perform a particular analysis or calculation, a round-trip communication must be performed between the client-side application and the server, wherein the user requests the change to be made locally within their, e.g., Excel™ spreadsheet, and the change is then communicated to or otherwise requested at the server, which updates its (remote) data structure, before passing the updated data or results back to the user's machine.

When changes to a local or client-side set of data are made infrequently, the performance lag associated with such a round-trip communication between the client-side application and server are generally acceptable.

However, when frequent changes are involved, such as with complex "what-if" type of analyses, the performance lag associated with the round-trip communication can discourage users from utilizing the server-based database structure.

Although in some instances, the system can allow a server-side model to be checked-out for local use by a client-side application, and then later checked-in to the server, such a procedure generally prevents others from using that particular model and associated data during that time, which is generally undesirable.

To address these situations, in accordance with an embodiment, described herein are systems and methods that enable client-side calculation with data provided at a multidimensional or other database server.

In accordance with an embodiment, data provided at the server in accordance with a server-side model, can be transformed into a grid, for use with a client-side application, for example a client spreadsheet application. During preparation of the grid, one or more portions of the grid that are identified as client-side dynamic parameters, can be represented as dynamic formulas that are modifiable within the client-side application; while parameters of the server-side model that are outside of the grid can be represented as constant values.

In accordance with an embodiment, the grid provided to the client can be used to perform client-side calculations that allow for rapid calculations in response to changes in the client-side model, without introducing a round-trip performance lag between the client-side and server-side.

Figure 2:
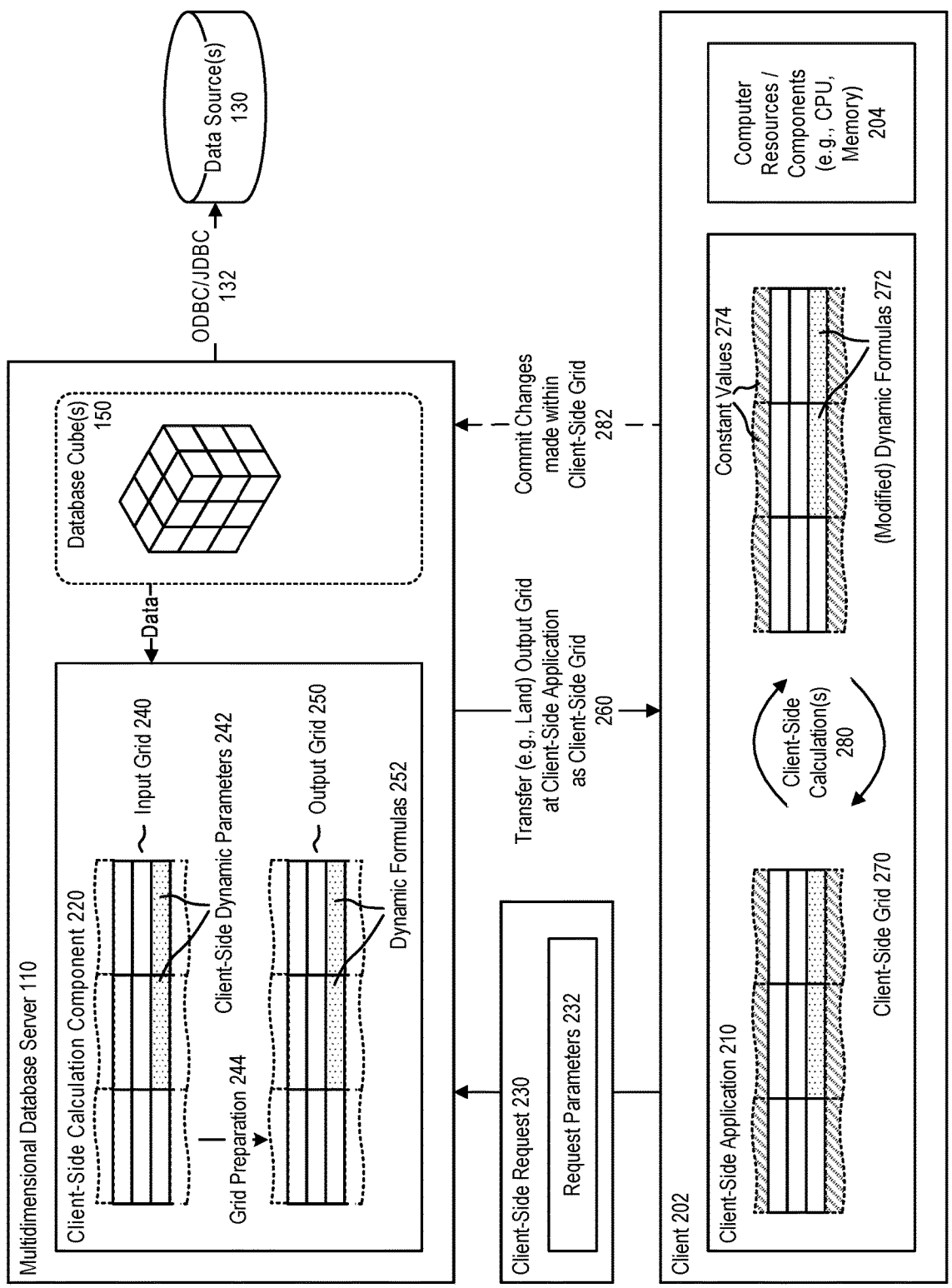
FIG. 2 illustrates an example of a system for supporting client-side calculation in a multidimensional database environment, in accordance with an embodiment.

FIG. 2 illustrates an example of a system for supporting client-side calculation in a multidimensional database environment, in accordance with an embodiment.

As illustrated in FIG. 2, in accordance with an embodiment, a multidimensional or other database environment, can provide a client-side calculation component 220, for example as part of a spreadsheet add-in or similar functionality, for use by a client 202 having computer resources/components (e.g., CPU, memory) 204.

For example, in accordance with an embodiment, the multidimensional database server can receive a request 230 from a client-side application 210, for example a client spreadsheet application, to create a grid for use in performing client-side calculations.

In accordance with an embodiment, the request can comprise one or more request parameters 232, which can be received as part of the request, and which are used to determine one or more client-side dynamic parameters 242, for which it is desired that the client-side application should be able to subsequently modify, during a client-side calculation.

For example, in accordance with an embodiment, a request can include parameters such as a desired set of rows or columns which are desired to be modifiable at the client-side application, during a client-side calculation.

In accordance with an embodiment, an input grid 240 is prepared by the server, using the data provided at, or as currently understood by the multidimensional or other database environment, and a determination is made as to whether any dimensions in the grid corresponds to the request parameters, for use in transforming the input grid to an output grid 250.

In accordance with an embodiment, if particular server-side parameters, e.g., dimensions, within the input grid are determined to correspond to client-side dynamic parameters, according to the received request (i.e., the received request indicates that the dimensions should be modifiable at the client-side application), then during grid preparation 244, instead of numeric values, the output grid is provided with dynamic formulas 252 for those dimensions.

Additionally, as described in further detail below, in accordance with an embodiment, if a particular server-side parameter, e.g., dimension, is outside of the grid boundary (i.e., will not be visible in the grid), then during grid preparation, that (non-visible) server-side parameter can be represented with a constant value.

In accordance with an embodiment, the output grid is prepared for transfer to the client, including dynamic formulas corresponding to client-side dynamic parameters, and other grid elements, taking into account constant values used to represent non-visible server-side parameters, e.g., dimensions, within the grid.

In accordance with an embodiment, the server can then transfer 260 the output grid to the client-side application, as a client-side grid 270, for example within a client spreadsheet application (e.g., by "landing" the output grid within a spreadsheet), for subsequent use during client-side calculations 280, including modification 272 of the dynamic formulas as desired, taking into account constant values 274 used to represent non-visible server-side parameters, e.g., dimensions, within the grid.

Optionally, changes that are made to the data or formulas within the client-side grid, can be subsequently committed 282 by the client-side application to the server, if desired, to update the server-side model for those parameters.

Client-Side Dynamic Formulas

Figure 3:
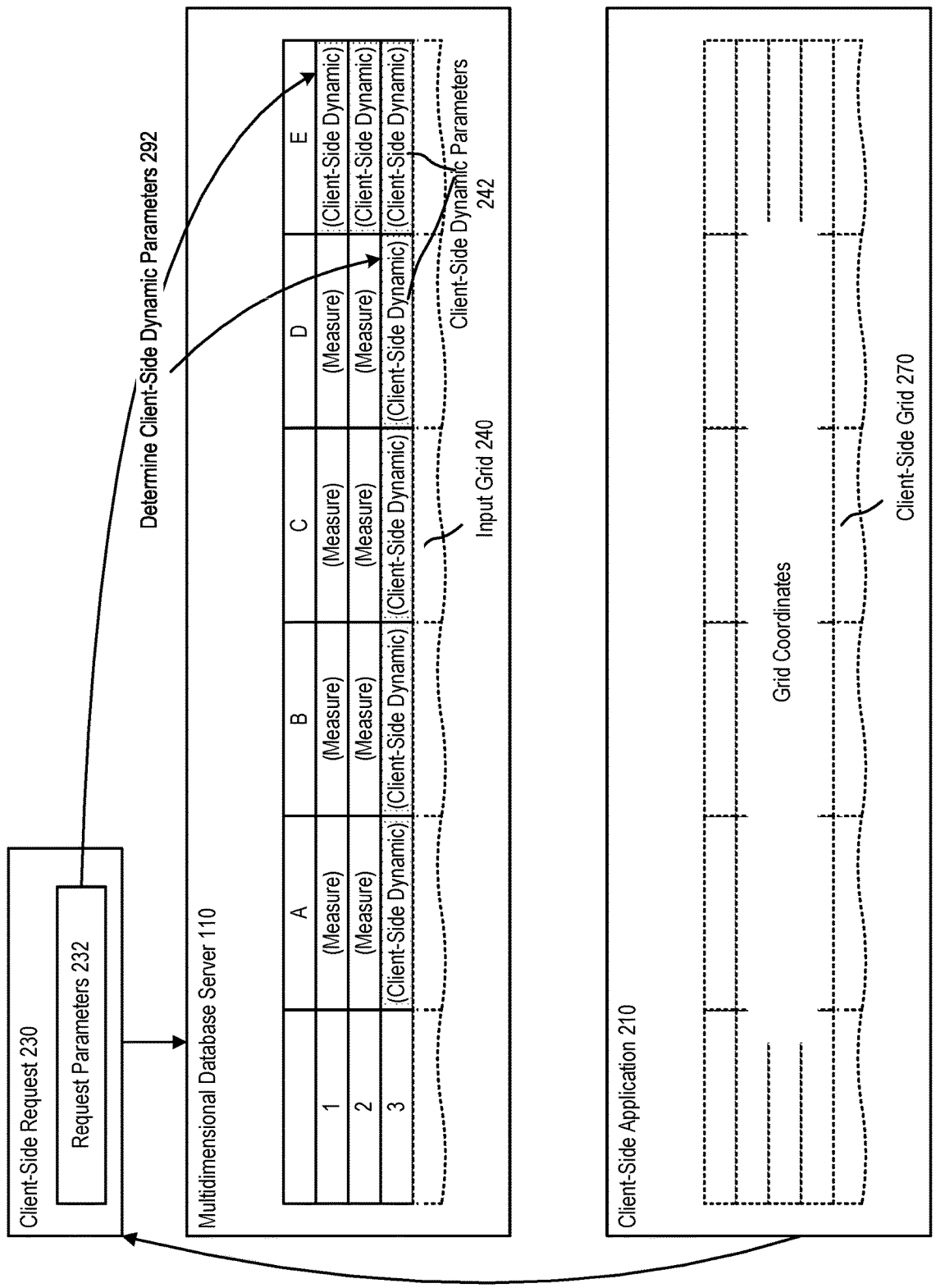
FIG. 3 illustrates how the system supports client-side calculation in a multidimensional database environment, in accordance with an embodiment.

FIG. 3 illustrates how the system supports client-side calculation in a multidimensional database environment, in accordance with an embodiment.

As illustrated in FIG. 3, in accordance with an embodiment, the request can comprise one or more request parameters, which can be received as part of the request, and which are used to determine 292 one or more client-side dynamic parameters, for which it is desired that the client-side application should be able to subsequently modify, during a client-side calculation.

In accordance with an embodiment, the request can include an indication of the grid coordinates that will be used at the client-side. For example, the request can indicate that Column E and Row 3 of the eventual grid are client-side dynamic parameters, and are desired to be modifiable at the client-side application, during a client-side calculation.

Figure 4:
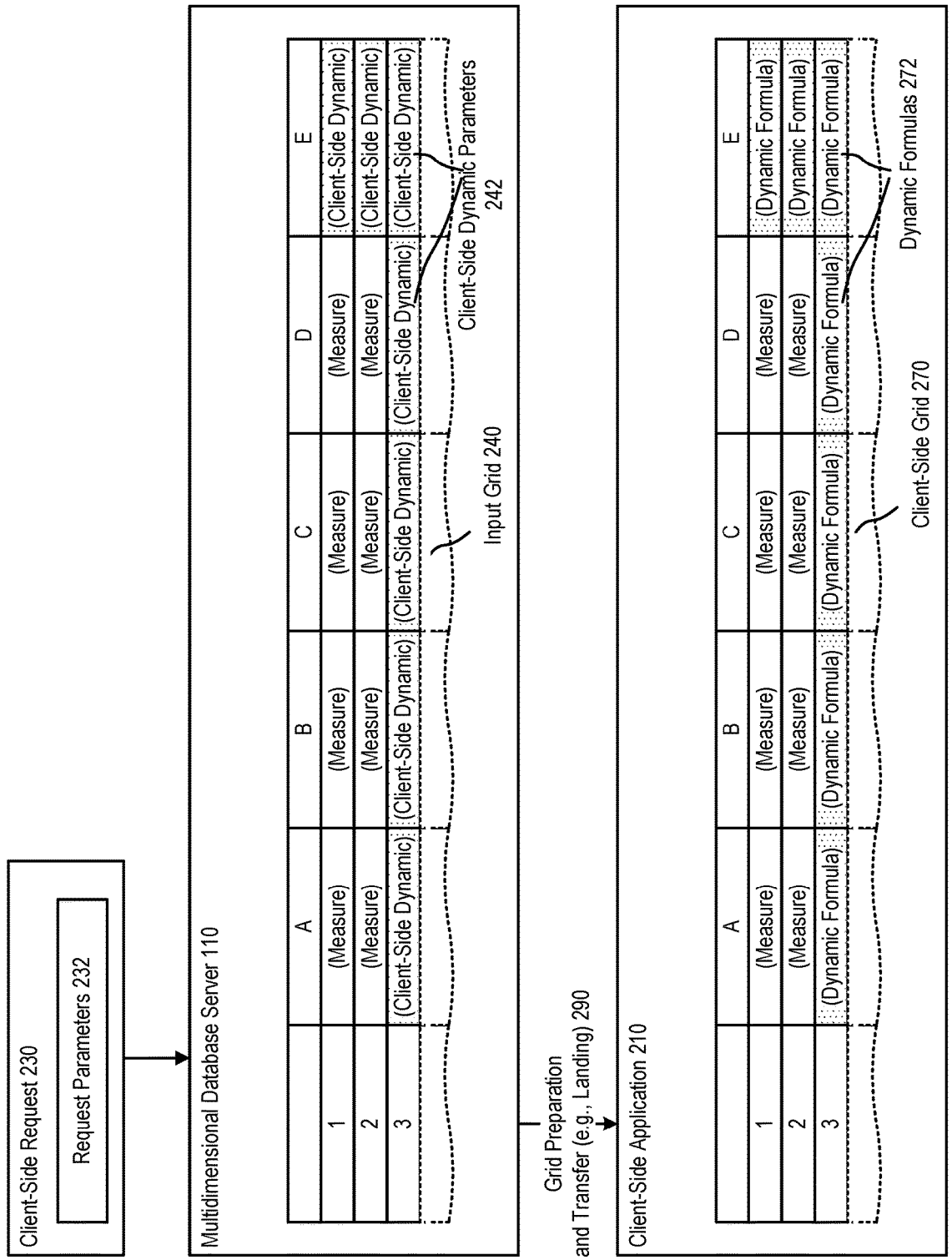
FIG. 4 further illustrates how the system supports client-side calculation in a multidimensional database environment, in accordance with an embodiment.

FIG. 4 further illustrates how the system supports client-side calculation in a multidimensional database environment, in accordance with an embodiment.

As illustrated in FIG. 4, in accordance with an embodiment, for those server-side parameters, e.g., dimensions, within the input grid determined to be client-side dynamic parameters, according to the received request, then during grid preparation and transfer (e.g., landing) 290, the client-side grid is provided with a dynamic formula for those, e.g., dimensions, including in this example Column E and Row 3.

For example, the system can transform a server-side model, such as "Demand Units=Demand Dollars/ASP" into a row/column formula or client-side model, such as "=(D2/D3)" that is understood by the client-side application (e.g., Excel), taking into account the grid coordinates (e.g., spreadsheet coordinates) of the client-side application.

Conversely, for those server-side parameters, e.g., dimensions, within the input grid determined not to be client-side dynamic parameters, according to the received request, then during grid preparation and transfer (e.g., landing), the client-side grid is provided with numeric values for those dimensions, as determined by the measurement of that data as currently understood by the server, which in this example includes each of those dimensions other than Column E and Row 3 (i.e., A1-A2, B1-B2, C1-C2, D1-D2).

Representation of Server-Side Parameters as Constant Values

As described above, in accordance with an embodiment, during grid preparation, if a particular server-side parameter, e.g., dimension, is outside of the grid boundary (i.e., will not be visible in the grid), then that dimension can be represented with a constant value during grid preparation.

Figure 5:
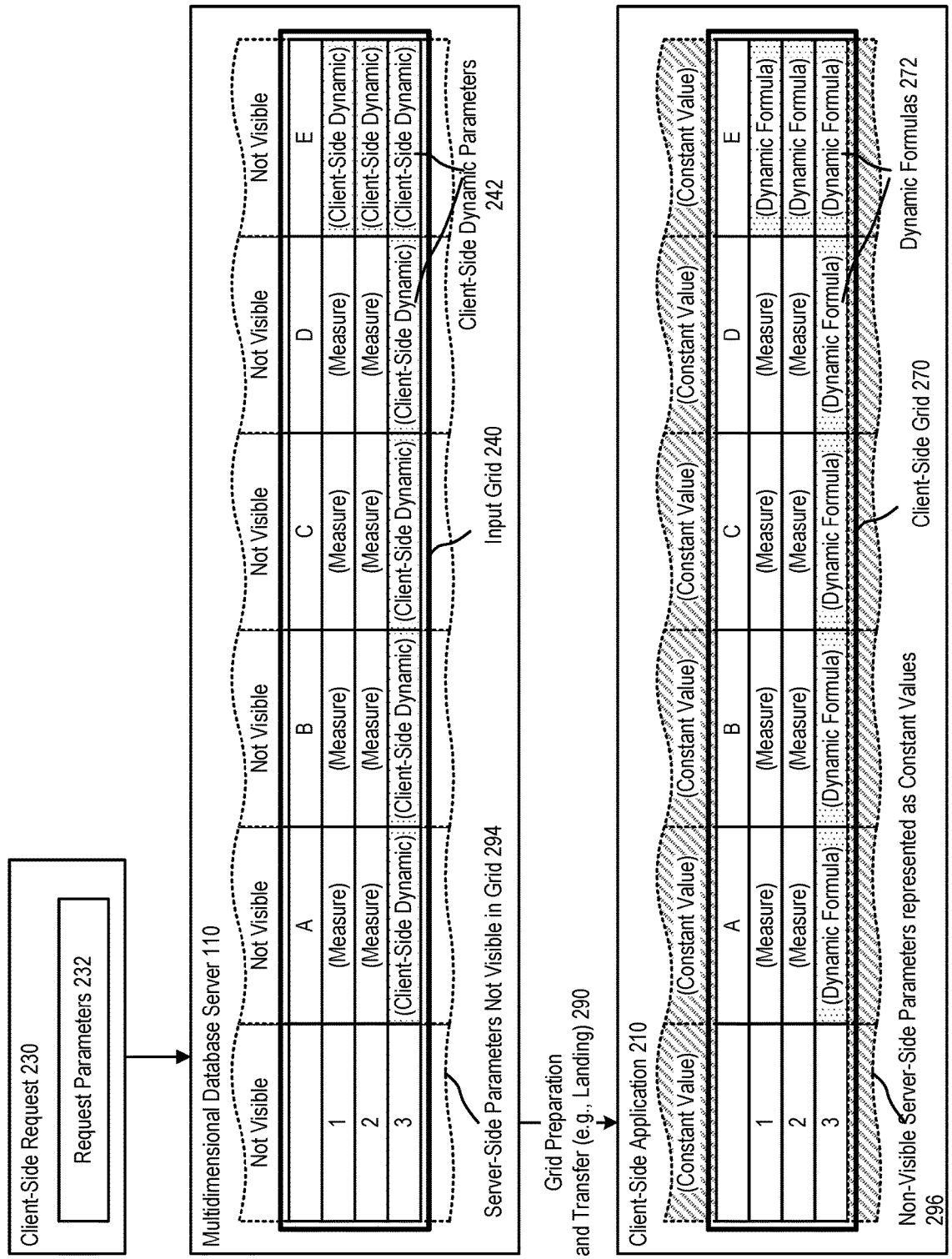
FIG. 5 illustrates how the system supports client-side calculation in a multidimensional database environment, including representation of server-side parameters as constant values, in accordance with an embodiment.

FIG. 5 illustrates how the system supports client-side calculation in a multidimensional database environment, including representation of server-side parameters as constant values, in accordance with an embodiment.

As illustrated in FIG. 5, in accordance with an embodiment, during grid preparation, those particular server-side parameters 294 that are outside of the grid boundary can be represented as constant values 296 during grid preparation.

For example, consider the following formula for Demand:

$$Q1=SUM(JAN,FEB,MAR)=SUM(D1,E1,F1)$$

In the above example, if the client-side user wishes to focus on January and February only, such that the client-side grid will not involve any changes to March, then the dynamic formula generated during grid preparation can instead be represented as $$Q1=SUM(JAN,FEB,45)=SUM(D1,E1,45)$$

Where the particular server-side parameter, in this example the Demand for March, that is outside of the grid boundary, is represented with a constant value during grid preparation.

The use of constant values to represent non-visible server-side parameters enables use of client side calculation to address other use cases, for example sparse aggregation with, say 10000 children, that only focuses on one child:

$$SUM(CurrentTotal+child1-CurrentValueOfChild1)$$

Example Client-Side Calculation

Figure 6:
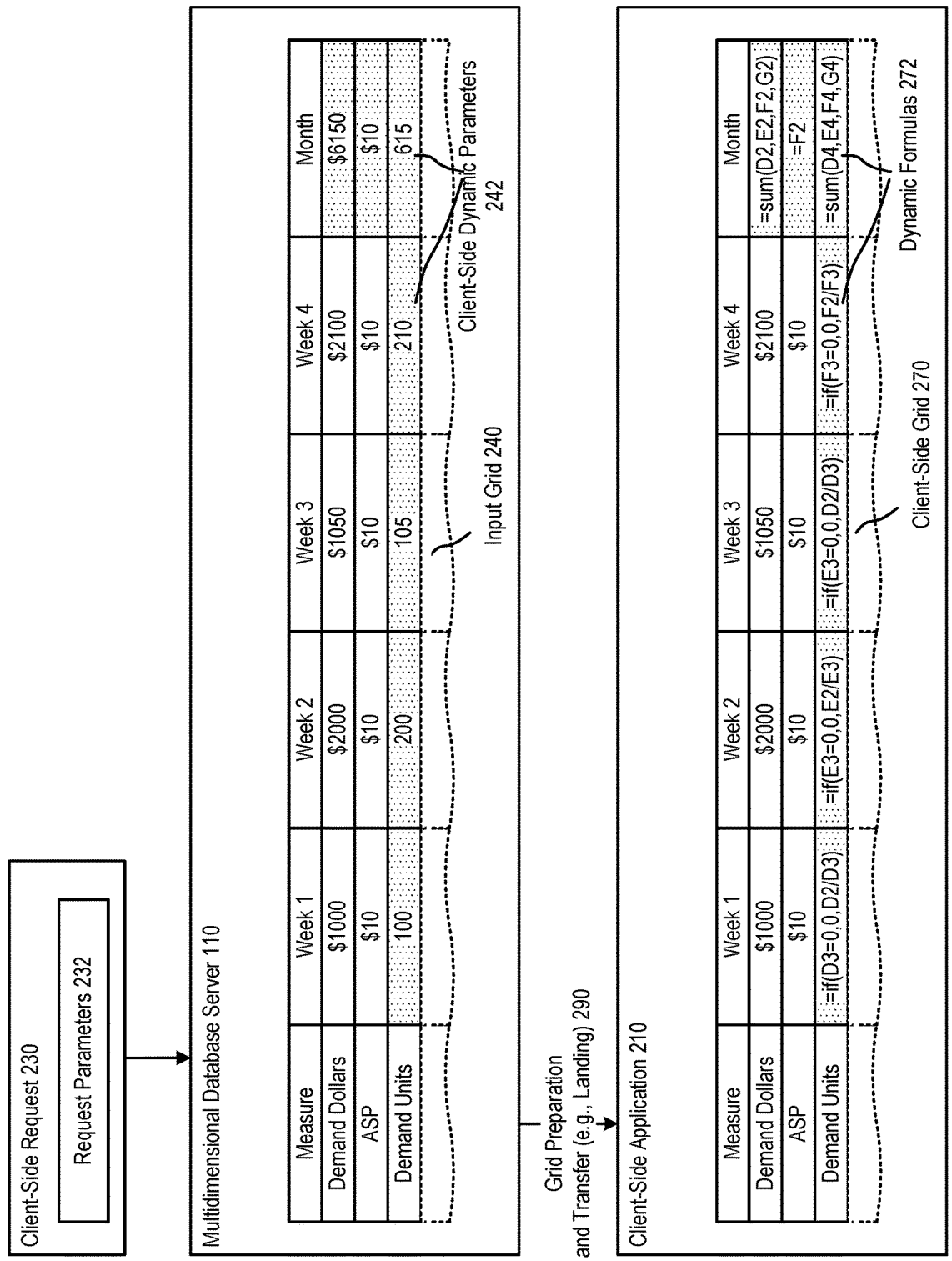
FIG. 6 illustrates an example client-side calculation with a multidimensional database structure, in accordance with an embodiment.

FIG. 6 illustrates an example client-side calculation with a multidimensional database structure, in accordance with an embodiment.

As illustrated in FIG. 6, in accordance with an embodiment, an exemplary input grid is shown, wherein demand units are calculated based upon dynamic formulas at the server. When a client wishes to alter or modify certain of the input parameters, instead of requiring the client to perform a server round-trip for each modification a client wishes to test, a grid preparation can take place at the server, to prepare the grid such that the input variables (such as "demand dollars" and "ASP") can become non-fixed (e.g., alterable by a client), and the server-side model for "demand units" is transformed into dynamic formulas.

In accordance with an embodiment, the output grid can be manipulated, or checked out by a client, which can then vary the inputs accordingly to whatever situation the client wishes to model locally. All computations then can take place locally at a client workstation/laptop, which can provide for the desired near instantaneous calculations based upon the compute formulas provided in the output grid. When a client has finished with the local calculations, the client can optionally signal the server that the changes to the output grid are ready to be checked in, and/or committed. The server can then receive any modified output grid and perform an integration of the new variable data that the client has inputted.

Client-Side Calculation Process

Figure 7:
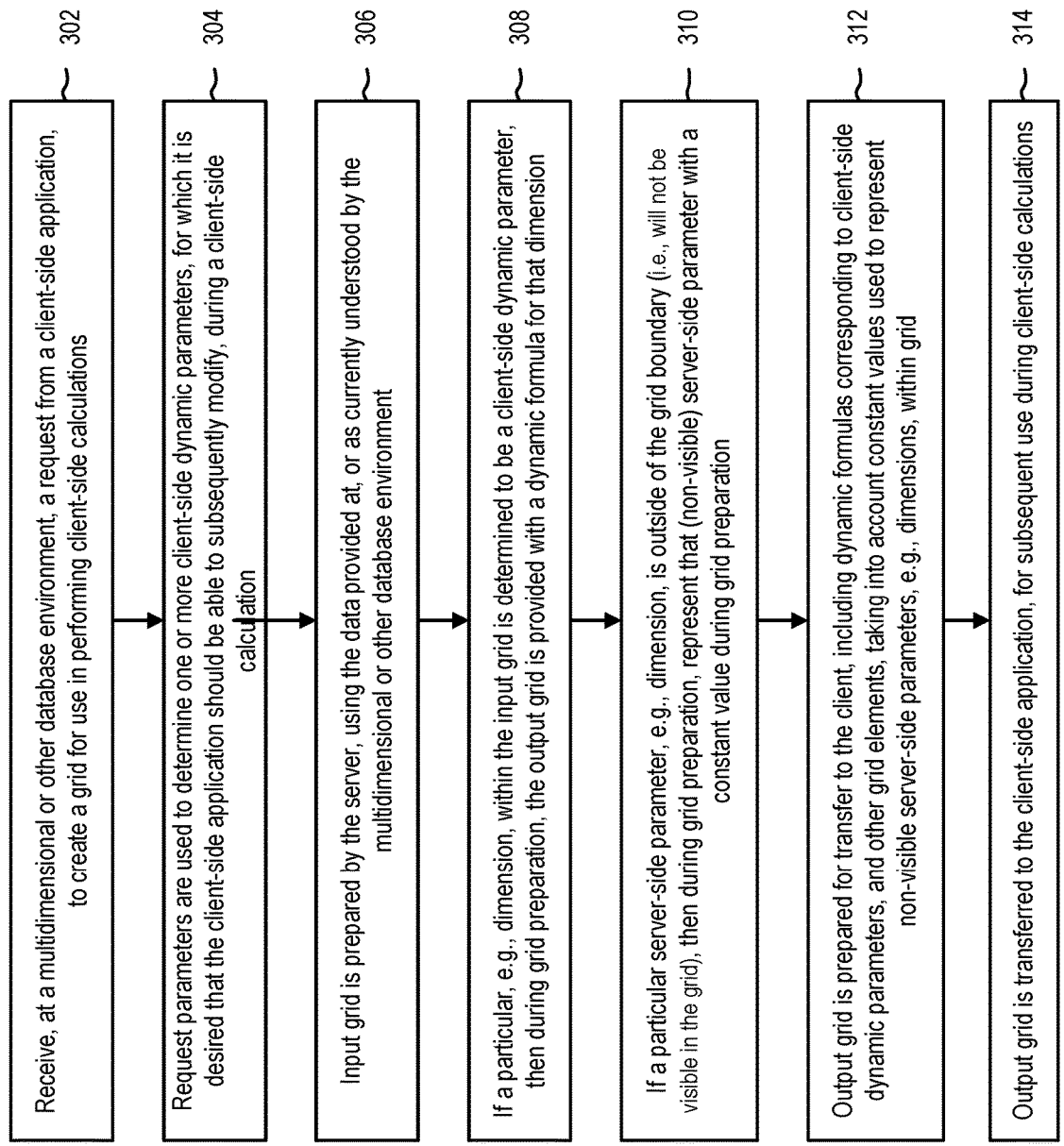
FIG. 7 is a flowchart of a method for supporting client-side calculation in a multidimensional database environment, in accordance with an embodiment.

FIG. 7 is a flowchart of a method for supporting client-side calculation in a multidimensional database environment, in accordance with an embodiment.

As illustrated in FIG. 7, in accordance with an embodiment, the method can start at step 302, by receiving, at a multidimensional or other database environment, a request from a client-side application, for example a client spreadsheet application, to create a grid for use in performing client-side calculations.

In accordance with an embodiment, at step 304, the request can comprise one or more request parameters, which can be received as part of the request, and which are used to determine one or more client-side dynamic parameters, for which it is desired that the client-side application should be able to subsequently modify, during a client-side calculation. For example, a request can include parameters such as a desired set of rows or columns which are desired to be modifiable at the client-side application, during a client-side calculation.

In accordance with an embodiment, at step 306, an input grid is prepared by the server, using the data provided at, or as currently understood by the multidimensional or other database environment, and a determination is made as to whether any dimensions in the grid corresponds to the request parameters, for use in transforming the input grid to an output grid.

In accordance with an embodiment, if at step 308, a particular, e.g., dimension, within the input grid is determined to be a client-side dynamic parameter, according to the received request (i.e., the received request indicates that the dimension should be modifiable at the client-side application), then during grid preparation, the output grid is provided with a dynamic formula for that dimension.

In accordance with an embodiment, if at step 310, a particular server-side parameter, e.g., dimension, is outside of the grid boundary (i.e., will not be visible in the grid), then during grid preparation, that (non-visible) server-side parameter can be represented with a constant value during grid preparation.

In accordance with an embodiment, at step 312, the output grid is prepared for transfer to the client, including dynamic formulas corresponding to client-side dynamic parameters, and other grid elements, taking into account constant values used to represent non-visible server-side parameters, e.g., dimensions, within the grid.

In accordance with an embodiment, at step 314, the server can then transfer the output grid to the client-side application, for example a client spreadsheet application, e.g., by "landing" the output grid within a spreadsheet application, for subsequent use during client-side calculations.

In accordance with various embodiments, advantages of the described system and method can include, for example, providing near instantaneous calculations in response to changes in data and dimensions without introducing the round-trip performance lag as described above; formula tracing to understand calculations and semantics; support for multiple users to work in isolation (e.g., within a sandbox), separate and distinct from other users; ability to download "remote" data from reporting systems, such as OBI EE, and Crystal reports; providing a complement to centralized "server" modeling, wherein a client-side tool, such as Excel, can be used as an active part of the data modelling; "planning" activities that allow for Instantaneous response instead of pressing "calculate" each time; avoiding server round trip; use of a server audit trail that tracks everything and allows for a client to experiment on the client-side before sending final results to the server.

Figure 8:
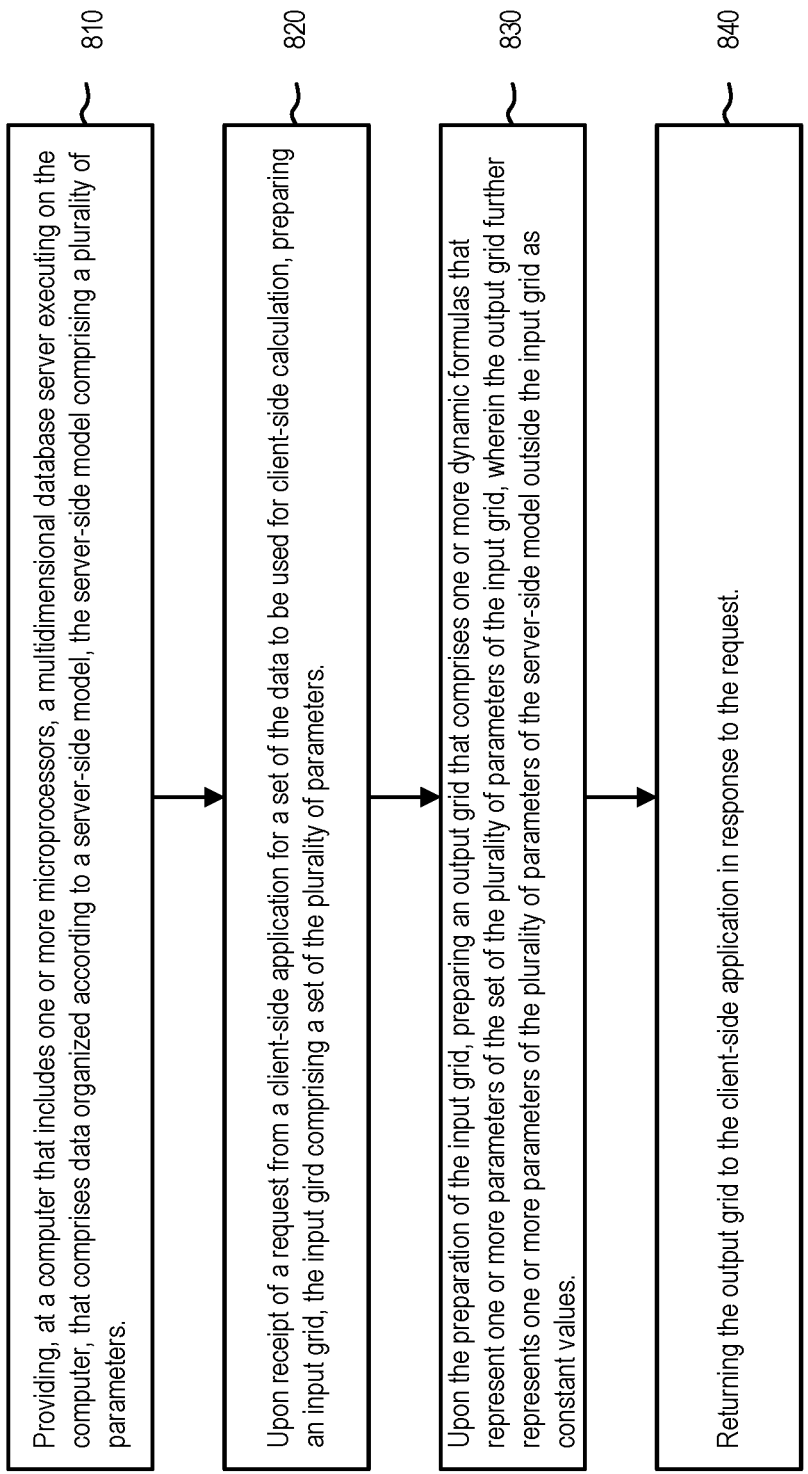
FIG. 8 shows a flowchart of a method for client-side calculation in a multidimensional database, in accordance with an embodiment.

FIG. 8 shows a flowchart of a method for client-side calculation in a multidimensional database, in accordance with an embodiment.

At step 810, the method can provide, at a computer that includes one or more microprocessors, a multidimensional database server executing on the computer, that comprises data organized according to a server-side model, the server-side model comprising a plurality of parameters.

At step 820, upon receipt of a request from a client-side application for a set of the data to be used for client-side calculation, the method can prepare an input grid, the input gird comprising a set of the plurality of parameters.

At step 830, upon the preparation of the input grid, the method can prepare an output grid that comprises one or more dynamic formulas that represent one or more parameters of the set of the plurality of parameters of the input grid, wherein the output grid further represents one or more parameters of the plurality of parameters of the server-side model outside the input grid as constant values.

At step 840, the method can return the output grid to the client-side application in response to the request.

While various embodiments of the present invention have been described above, it should be understood that they have been presented by way of example, and not limitation. The embodiments were chosen and described in order to explain the principles of the invention and its practical application. The embodiments illustrate systems and methods in which the present invention is utilized to improve the performance of the systems and methods by providing new and/or improved features and/or providing benefits such as reduced resource utilization, increased capacity, improved efficiency, and reduced latency.

In some embodiments, features of the present invention are implemented, in whole or in part, in a computer including a processor, a storage medium such as a memory and a network card for communicating with other computers. In some embodiments, features of the invention are implemented in a distributed computing environment in which one or more clusters of computers is connected by a network such as a Local Area Network (LAN), switch fabric network (e.g. InfiniBand), or Wide Area Network (WAN). The distributed computing environment can have all computers at a single location or have clusters of computers at different remote geographic locations connected by a WAN.

In some embodiments, features of the present invention are implemented, in whole or in part, in the cloud as part of, or as a service of, a cloud computing system based on shared, elastic resources delivered to users in a self-service, metered manner using Web technologies. There are five characteristics of the cloud (as defined by the National Institute of Standards and Technology: on-demand self-service; broad network access; resource pooling; rapid elasticity; and measured service. Cloud deployment models include: Public, Private, and Hybrid. Cloud service models include Software as a Service (SaaS), Platform as a Service (PaaS), Database as a Service (DBaaS), and Infrastructure as a Service (IaaS). As used herein, the cloud is the combination of hardware, software, network, and web technologies which delivers shared elastic resources to users in a self-service, metered manner. Unless otherwise specified the cloud, as used herein, encompasses public cloud, private cloud, and hybrid cloud embodiments, and all cloud deployment models including, but not limited to, cloud SaaS, cloud DBaaS, cloud PaaS, and cloud IaaS.

In some embodiments, features of the present invention are implemented using, or with the assistance of hardware, software, firmware, or combinations thereof. In some embodiments, features of the present invention are implemented using a processor configured or programmed to execute one or more functions of the present invention. The processor is in some embodiments a single or multi-chip processor, a digital signal processor (DSP), a system on a chip (SOC), an application specific integrated circuit (ASIC), a field programmable gate array (FPGA) or other programmable logic device, state machine, discrete gate or transistor logic, discrete hardware components, or any combination thereof designed to perform the functions described herein. In some implementations, features of the present invention may be implemented by circuitry that is specific to a given function. In other implementations, the features may implemented in a processor configured to perform particular functions using instructions stored e.g. on a computer readable storage media.

In some embodiments, features of the present invention are incorporated in software and/or firmware for controlling the hardware of a processing and/or networking system, and for enabling a processor and/or network to interact with other systems utilizing the features of the present invention. Such software or firmware may include, but is not limited to, application code, device drivers, operating systems, virtual machines, hypervisors, application programming interfaces, programming languages, and execution environments/containers. Appropriate software coding can readily be prepared by skilled programmers based on the teachings of the present disclosure, as will be apparent to those skilled in the software art.

In some embodiments, the present invention includes a computer program product which is a storage medium or computer-readable medium (media) having instructions stored thereon/in, which instructions can be used to program or otherwise configure a system such as a computer to perform any of the processes or functions of the present invention. The storage medium or computer readable medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. In particular embodiments, the storage medium or computer readable medium is a non-transitory storage medium or non-transitory computer readable medium.

The foregoing description is not intended to be exhaustive or to limit the invention to the precise forms disclosed. Additionally, where embodiments of the present invention have been described using a particular series of transactions and steps, it should be apparent to those skilled in the art that the scope of the present invention is not limited to the described series of transactions and steps. Further, where embodiments of the present invention have been described using a particular combination of hardware and software, it should be recognized that other combinations of hardware and software are also within the scope of the present invention. Further, while the various embodiments describe particular combinations of features of the invention it should be understood that different combinations of the features will be apparent to persons skilled in the relevant art as within the scope of the invention such that features of one embodiment may incorporated into another embodiment. Moreover, it will be apparent to persons skilled in the relevant art that various additions, subtractions, deletions, variations, and other modifications and changes in form, detail, implementation and application can be made therein without departing from the spirit and scope of the invention. It is intended that the broader spirit and scope of the invention be defined by the following claims and their equivalents.

What is claimed is:

1. A system for client-side calculation with a multidimensional database, comprising:
a computer that includes one or more microprocessors; and
a multidimensional database server executing on the computer, that comprises data organized according to a server-side model, the server-side model comprising a plurality of parameters;
wherein upon receipt of a request from a client-side application for a set of the data to be used for client-side calculation wherein the request includes a plurality of request parameters including one or more dynamic request parameters which identify a set of rows or columns of data required to be modifiable in said client-side calculation, an input grid is prepared having a plurality of dimensions;
wherein, the multidimensional database server is configured to,
determine which of a plurality of dimensions correspond to the one or more dynamic request parameters of the plurality of request parameters;
prepare an output grid that comprises one or more dynamic formulas that represent said dimensions and one or more parameters of the plurality of parameters of the server-side model outside the input grid as constant values, and
return the output grid to the client-side application in response to the request;
whereby, after loading the output grid in the client-side application, client-side calculations modifying the output grid are performed utilizing the one or more dynamic formulas to update the output grid.

2. The system of claim 1, wherein the multidimensional data base server is configured to prepare an input grid having the plurality of dimensions according to a current set of data provided at the multidimensional database server.

3. The system of claim 1,
wherein the request does not include the dynamic formulas.

4. The system of claim 1, wherein, the one or more dynamic formulas are modifiable within the client-side application.

5. The system of claim 1, wherein the plurality of parameters that comprises the input grid are contiguous.

6. The system of claim 1, wherein at least one of the one or more parameters of the plurality of parameters of the server-side model outside the input grid represented as constant values are used in at least one of the one or more dynamic formulas.

7. The system of claim 1,
wherein a modified grid, is returned to the multidimensional database server by the client-side application; and
wherein the modified grid is committed to update the server-side model.

8. A method for client-side calculation in a multidimensional database, comprising:
providing, at a computer that includes one or more microprocessors, a multidimensional database server executing on the computer, that comprises data organized according to a server-side model, the server-side model comprising a plurality of parameters;
receiving a request from a client-side application for a set of the data to be used for client-side calculation wherein the request includes a plurality of request parameters including one or more dynamic request parameters which identify a set of rows or columns of data required to be modifiable in said client-side calculation;
determining which of a plurality dimensions correspond to the one or more dynamic request parameters of the plurality of request parameters;
preparing an output grid that comprises one or more dynamic formulas that represent said dimensions determined to correspond to the one or more dynamic request parameters of the plurality of request parameters, wherein the output grid further represents one or more parameters of the plurality of parameters of the server-side model outside the input grid as constant values;
returning the output grid to the client-side application in response to the request; and
whereby, after loading the output grid in the client-side application, client-side calculations modifying the output grid are performed utilizing the one or more dynamic formulas to update the output grid.

9. The method of claim 8, further comprising preparing an input grid according to a current set of data provided at the multidimensional database server.

10. The method of claim 8,
wherein the request does not include the dynamic formulas.

11. The method of claim 8, wherein, the one or more dynamic formulas are modifiable within the client-side application.

12. The method of claim 8, wherein the set of the plurality of parameters that comprises the input grid are contiguous.

13. The method of claim 8, wherein at least one of the one or more parameters of the plurality of parameters of the server-side model outside the input grid represented as constant values are used in at least one of the one or more dynamic formulas.

14. The method of claim 8,
wherein a modified grid, is returned to the multidimensional database server by the client-side application; and
wherein the modified grid is committed to update the server-side model.

15. A non-transitory computer readable storage medium including instructions stored thereon which when read and executed by one or more computers cause the one or more computers to perform steps comprising:
providing, at a computer that includes one or more microprocessors, a multidimensional database server executing on the computer, that comprises data organized according to a server-side model, the server-side model comprising a plurality of parameters;
receiving a request from a client-side application for a set of the data to be used for client-side calculation wherein the request includes a plurality of request parameters including one or more dynamic request parameters which identify a set of rows or columns of data required to be modifiable in said client-side calculation;

determining which of a plurality of dimensions correspond to the one or more dynamic request parameters of the plurality of request parameters;

preparing an output grid that comprises one or more dynamic formulas that represent said dimensions determined to correspond to the one or more dynamic parameters of the set of the plurality of parameters, wherein the output grid further represents one or more parameters of the plurality of parameters of the server-side model outside the input grid as constant values;

returning the output grid to the client-side application in response to the request; and whereby, after loading the output grid in the client-side application, client-side calculations modifying the output grid are performed utilizing the one or more dynamic formulas to update the output grid.

16. The non-transitory computer readable storage of claim 15, further comprising:

preparing an input grid comprising the plurality of dimensions according to a current set of data provided at the multidimensional database server.

17. The non-transitory computer readable storage of claim 15, wherein the request does not include the dynamic formulas.

18. The non-transitory computer readable storage of claim 15, wherein, the one or more dynamic formulas are modifiable in the client-side application.

19. The non-transitory computer readable storage of claim 15, wherein the plurality of parameters that comprises the input grid are contiguous.

20. The non-transitory computer readable storage of claim 15, wherein at least one of the one or more parameters of the plurality of parameters of the server-side model outside the input grid represented as constant values are used in at least one of the one or more dynamic formulas.

* * * * *